(12) United States Patent
Goodwin et al.

(10) Patent No.: US 11,690,334 B2
(45) Date of Patent: Jul. 4, 2023

(54) HYDROPONIC GROWING UNIT

(71) Applicants: Randy M. Goodwin, Grove City, OH (US); Robert W. Harriman, Delaware, OH (US); Bradley A. Schultz, Powell, OH (US); Jennifer D. Orsi, Santa Rosa, CA (US); Charles H. Ostman, Sebastopol, CA (US); Jay F. Perkins, Pickerington, OH (US); John P. Cichello, II, Wooster, OH (US)

(72) Inventors: Randy M. Goodwin, Grove City, OH (US); Robert W. Harriman, Delaware, OH (US); Bradley A. Schultz, Powell, OH (US); Jennifer D. Orsi, Santa Rosa, CA (US); Charles H. Ostman, Sebastopol, CA (US); Jay F. Perkins, Pickerington, OH (US); John P. Cichello, II, Wooster, OH (US)

(73) Assignees: HGCI, Inc., Las Vegas, NV (US); OMS Investments, Inc., Los Angeles, CA (US)

( * ) Notice: Subject to any disclaimer, the term of this patent is extended or adjusted under 35 U.S.C. 154(b) by 207 days.

(21) Appl. No.: 17/113,327

(22) Filed: Dec. 7, 2020

(65) Prior Publication Data

US 2021/0153446 A1    May 27, 2021

Related U.S. Application Data

(63) Continuation of application No. 15/724,163, filed on Oct. 3, 2017, now Pat. No. 10,856,479.

(Continued)

(51) Int. Cl.
   *A01G 31/02*    (2006.01)

(52) U.S. Cl.
   CPC .............. *A01G 31/02* (2013.01); *Y02P 60/21* (2015.11)

(58) Field of Classification Search
   CPC ........ A01G 31/02; A01G 31/04; A01G 31/06; A01G 2031/006; A01G 27/08;
   (Continued)

(56) References Cited

U.S. PATENT DOCUMENTS

| 1,959,510 A | 5/1934 | Van Waveren |
| 2,740,546 A * | 4/1956 | Kowalski ............. B65D 25/108 211/74 |

(Continued)

FOREIGN PATENT DOCUMENTS

KR          101445189 B1       9/2014

OTHER PUBLICATIONS

International Search Report received for International Application No. PCT/US17/54990; dated Feb. 1, 2018; 5 pages.

*Primary Examiner* — Ebony E Evans

(57) ABSTRACT

Various embodiments include a container for hydroponically growing plants. The container has a bottom surface and an open top surface and a fluid reservoir having at least a portion of the volume between the bottom surface and the top surface. A pump is positioned at a bottom portion of the fluid reservoir. A length of tubing connects the pump to a valve that is further connected to additional tubing. A plurality of jets are connected to the additional tubing to spray fluid internal to the fluid reservoir. Further, there is a support structure, configured to fit into the open top surface, that has support components for interconnecting a plurality of openings and supporting the plurality of jets. Finally, a cover plate is configured to fit over the support structure in the open top surface.

18 Claims, 21 Drawing Sheets

Related U.S. Application Data

(60) Provisional application No. 62/403,504, filed on Oct. 3, 2016.

(58) Field of Classification Search
CPC .... A01G 27/001; A01G 27/003; A01G 27/02; A01G 27/06; A01G 29/00; Y02P 60/21
See application file for complete search history.

(56) References Cited

U.S. PATENT DOCUMENTS

| | | | |
|---|---|---|---|
| 2,930,162 A | | 3/1960 | Mulford |
| 3,984,941 A | * | 10/1976 | Chetta, Jr. ................. B65F 1/14 |
| | | | 428/34.1 |
| 4,083,147 A | * | 4/1978 | Garrick ................ A01G 27/003 |
| | | | 137/397 |
| 4,646,628 A | * | 3/1987 | Lederman ............. A47J 27/122 |
| | | | 99/413 |
| 5,282,335 A | * | 2/1994 | Holtkamp, Jr. ......... A01G 27/04 |
| | | | 47/84 |
| 5,394,647 A | | 3/1995 | Blackford, Jr. |
| 5,502,923 A | | 4/1996 | Bradshaw |
| 6,038,812 A | * | 3/2000 | Belokin ................... A01G 5/04 |
| | | | 40/430 |
| 6,247,268 B1 | * | 6/2001 | Auer ...................... A01G 31/02 |
| | | | 47/62 A |
| 6,634,138 B2 | | 10/2003 | Katzman |
| 6,652,348 B2 | * | 11/2003 | Yen ........................ B05B 17/08 |
| | | | 446/159 |
| 6,901,700 B2 | * | 6/2005 | Trabka .................... A47G 7/02 |
| | | | 47/86 |
| 7,069,691 B2 | * | 7/2006 | Brooke .................. A01G 31/02 |
| | | | 47/59 R |
| 8,782,950 B2 | * | 7/2014 | Miel ........................ A01G 9/02 |
| | | | 47/85 |
| 9,113,606 B2 | | 8/2015 | Gardner et al. |
| 9,345,207 B2 | | 5/2016 | Juncal et al. |
| 9,456,560 B1 | | 10/2016 | MacKichan et al. |
| 9,648,811 B2 | | 5/2017 | Narasipur |
| 9,872,095 B2 | * | 1/2018 | Lee ........................ H04R 1/028 |
| 10,149,442 B2 | * | 12/2018 | Hohmann ............ A01G 27/005 |
| D850,323 S | * | 6/2019 | Kaminski .................... D11/152 |
| 10,856,479 B2 | * | 12/2020 | Goodwin ............... A01G 31/02 |
| 2002/0084346 A1 | | 7/2002 | Katzman |
| 2002/0116870 A1 | * | 8/2002 | Chen .................... A01G 27/006 |
| | | | 47/48.5 |
| 2005/0229487 A1 | | 10/2005 | Whisenant |
| 2005/0246955 A1 | * | 11/2005 | Bissonnette ............. A01C 1/02 |
| | | | 47/62 A |
| 2005/0274073 A1 | * | 12/2005 | Brooke .................. A01G 31/02 |
| | | | 47/59 R |
| 2006/0288640 A1 | * | 12/2006 | Leithold ................ A01G 9/028 |
| | | | 47/39 |
| 2008/0032806 A1 | | 2/2008 | Henry et al. |
| 2008/0282610 A1 | | 11/2008 | Bissonnette et al. |
| 2008/0313960 A1 | | 12/2008 | Norvitch |
| 2009/0151248 A1 | * | 6/2009 | Bissonnette ........... A01G 31/02 |
| | | | 47/62 R |
| 2011/0056132 A1 | | 3/2011 | Gardner |
| 2011/0232190 A1 | | 9/2011 | Pindus et al. |
| 2013/0255152 A1 | | 10/2013 | Johnson et al. |
| 2014/0101999 A1 | | 4/2014 | Gardner et al. |
| 2015/0068122 A1 | | 3/2015 | Juncal et al. |
| 2015/0156973 A1 | | 6/2015 | Prinster et al. |
| 2015/0334928 A1 | | 11/2015 | Kort |
| 2016/0057950 A1 | * | 3/2016 | Narasipur ............. A01G 31/02 |
| | | | 47/62 A |
| 2018/0035618 A1 | * | 2/2018 | Brown ................... B65D 25/54 |
| 2018/0368346 A1 | | 12/2018 | Watson |

* cited by examiner

HYDROPONIC GROWING UNIT

CROSS REFERENCE TO RELATED APPLICATIONS

This application is a continuation of U.S. patent application Ser. No. 15/724,163, filed Oct. 3, 2017, which claims the priority benefit of U.S. Provisional Patent Application No. 62/403,504, filed Oct. 3, 2016, the disclosure of each of which is hereby incorporated herein by reference in its entirety.

TECHNICAL FIELD

The various embodiments relate to hydroponic units, and more specifically to self-contained hydroponic units for residential use.

BACKGROUND INFORMATION

Conventional hydroponic systems come in many forms, and are often a trough-like shape, where a row or multiple rows of plants are grown. The pumps can be external to the water trough or water reservoir in these types of systems. Further, multiple hydroponic units can be linked together by a pump and water flow tubing. The water spray may be positioned at the roots of a plant. The water level indicators on conventional hydroponic systems are typically secured in a fixed location on the hydroponic unit. Conventional hydroponic systems may have other fixed components such as the pump or lighting fixture.

Improvements to hydroponic growing units may be made to overcome deficiencies in existing hydroponic growers.

SUMMARY

Exemplary embodiments include a hydroponic growing apparatus with a container having a bottom surface and an open top surface. A fluid reservoir is within the container, and a pump, having an inlet and an outlet, is positioned in the fluid reservoir. There is a plurality of tubing sections and a valve connected to one of the tubing sections as well as a fluid output tube in fluid communication with the pump outlet and the valve. A plurality of jets is connected to one or more of the tubing sections such that fluid flowing through the tubing sections, from the valve, exhausts through at least one of the plurality of jets. A support structure is configured to fit into the open top surface and has support components interconnecting a plurality of openings.

In various embodiments, the container has a circular outer surface. In other embodiments, the container has a square shape with rounded corners.

Another exemplary embodiment includes a hydroponic growing apparatus having a container with an internal volume for use as a fluid reservoir and a pump located at a bottom portion of the fluid reservoir. A support structure including five structurally connected openings is located at an upper portion of the container. And a plurality of fluid jets are fluidly coupled to the pump and located around a periphery of the container below the support structure. A repositionable fluid level indicator tube is included that has a fluid level indicator and that is positionable in any of the five structurally connected openings.

Another exemplary embodiment includes a hydroponic growing apparatus including a diverter valve fluidly connected to a pump via a connector tube and a plurality of tubing sections connected together by a plurality of jets and at least one tubing section is connected to the diverter valve. A repositionable section of tubing is connected to the valve and is configured to direct fluid to a location external to the container. Finally, a support structure having horizontal support beams interconnecting a plurality of openings is included and the support structure further provides support to the plurality of jets.

These and aspects of the exemplary embodiments will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION

The following description is intended to convey a thorough understanding of the embodiments by providing various embodiments and details involving a hydroponic unit. It is understood, however, that the invention is not limited to these specific embodiments and details, which are exemplary only. It is further understood that one possessing ordinary skill in the art, in light of known devices, systems and methods, would appreciate the use of the invention for its intended purposes and benefits in any number of alternative embodiments.

Generally speaking, the hydroponic unit of the various exemplary embodiments described herein includes a container having a bottom surface and an open top surface. A fluid reservoir is within the container, and a pump, having an inlet and an outlet, is positioned in the fluid reservoir. There is a plurality of tubing sections and a valve connected to one of the tubing sections as well as a fluid output tube in fluid communication with the pump outlet and the valve. A plurality of jets is connected to one or more of the tubing sections such that fluid flowing through the tubing sections, from the valve, exhausts through at least one of the plurality of jets. A support structure is configured to fit into the open top surface and has support components interconnecting a plurality of openings.

Figure 1:
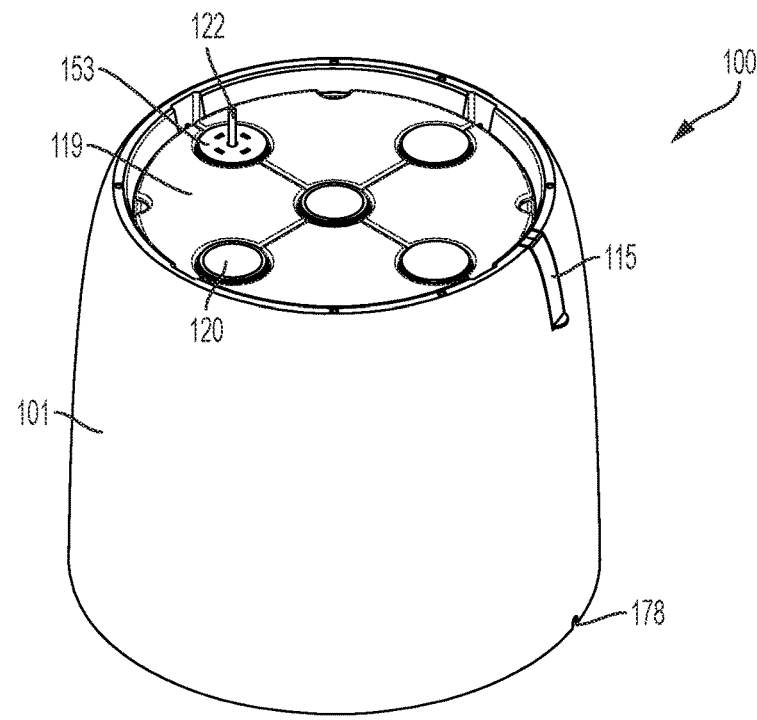
FIG. 1 depicts a perspective view of an exemplary embodiment of a hydroponic unit.

Referring to FIG. 1, a perspective view of a hydroponic unit 100 in accordance with an exemplary embodiment is illustrated. It should be appreciated that unit 100 is a simplified view exemplary unit and may include additional elements that are not depicted. As shown, the unit may include a container 101 with a flat bottom surface 102, a top surface with an opening 174, and a fluid reservoir 156; tubing 113 and a valve 112, a pump 107 located at the bottom inside surface of the reservoir 155; a pump housing cover 109; a fluid intake 145 connected to the pump; a fluid output tube 146 connected to the pump and to the valve; at least one jet 114 connected to the tubing; a support structure 116 with at least one opening 117, 118; and at least one cover plate 119; and a repositionable fluid level indicator tube 121 with a fluid level indicator 122 located at least partially within the tube.

The hydroponic unit 100 may come in a variety of external shapes. In one exemplary embodiment, the exterior of the unit is substantially cylindrical in shape, with a substantially cylindrical shaped fluid reservoir. In another exemplary embodiment, an exterior of the unit is substantially square shaped, and may have rounded edges, with a substantially cylindrical shaped fluid reservoir.

A hydroponic unit 100 and its components may be made of a variety of suitable materials, including, but not limited to, plastics, metals, and various combinations thereof. For example, the materials may include nylon, polypropylene, ABS, co-polymers, etc. In an exemplary embodiment, the container, fluid jets, plugs, fluid level indicator tube, and baskets are made of polypropylene, the support structure is made of nylon, the fluid level indicator positioned within the fluid level indicator tube and the cover plates are made of acrylonitrile butadiene styrene (ABS), the tubing pieces are made of linear low density polyethylene. The use of ABS for the cover plates provides a stiff material that is not prone to warping when molded into a flat shape. The use of nylon for the support structure creates a more stiff support structure, thereby providing greater support and increasing the hoop stress of the unit as compared to more flexible materials. Different resins may be used for the different components depending on the desired price point and cost of manufacturing. For example, the tubing components may be made of other types of plastic such as a clarified polyethylene so that the inside contents of the tubing are visible. Other useful materials include, for example, acrylonitrile butadiene styrene, polyethylene terephthalate glycol, polystyrene, polycarbonate, recycled, recyclable, photodegradable, and biodegradable plastics. Useful degradable plastics do not degrade during use of the device. Biodegradable plastic materials are particularly useful for terraced aerators and net baskets which may be transplanted with plants. Useful metals include gold, copper, steel, stainless steel, nickel, plated metals, stamped metals, and other electrically conductive metals known in the art. Carbon fiber may also be used to form the components of the device if an increased stiffness and durability of the components is desired.

Figure 2:
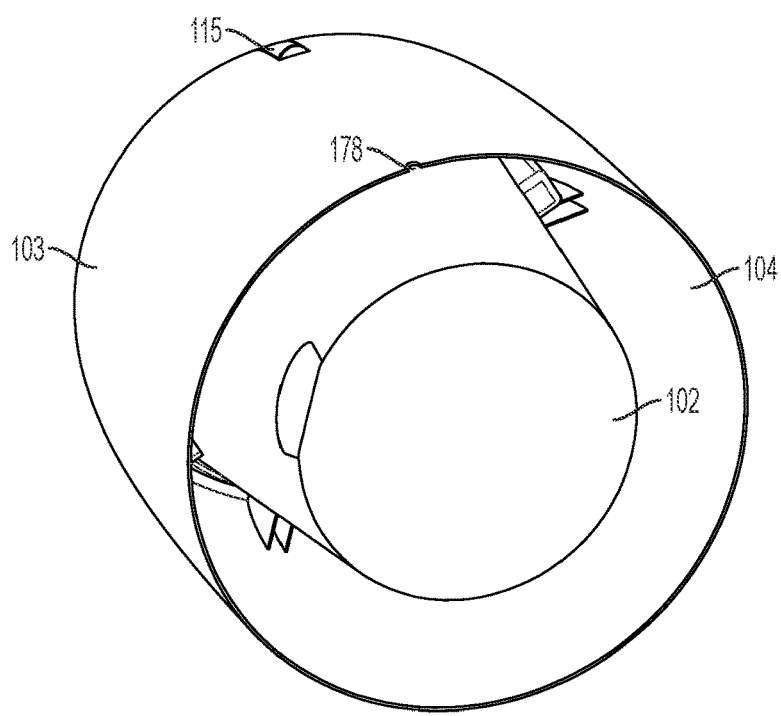
FIG. 2 depicts another perspective view of an exemplary embodiment of a hydroponic unit.
Figure 3:
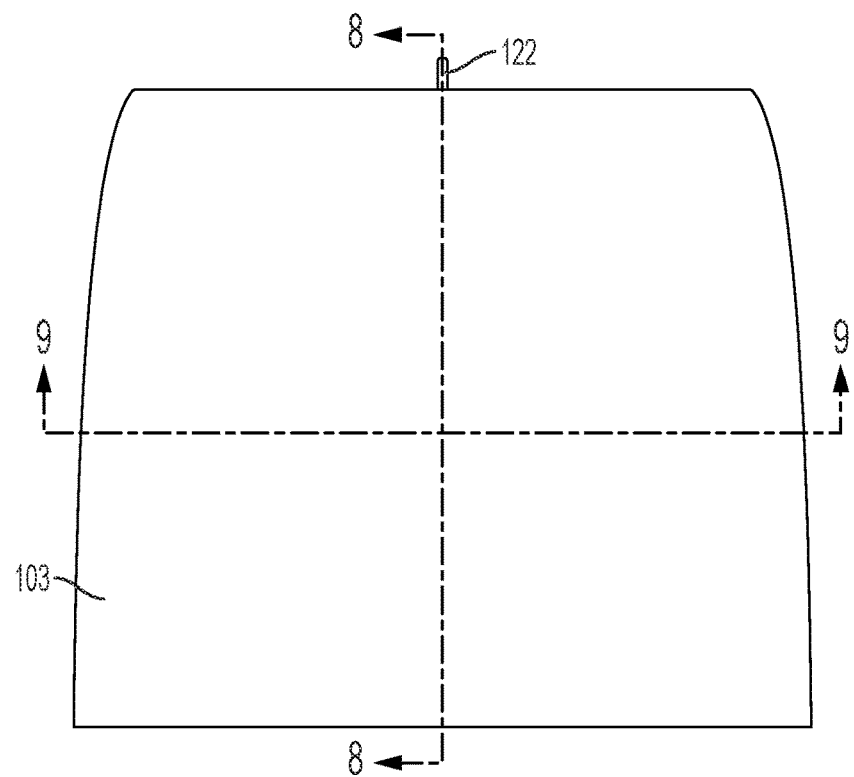
FIG. 3 depicts a side view of an exemplary embodiment of a hydroponic unit.
Figure 4:
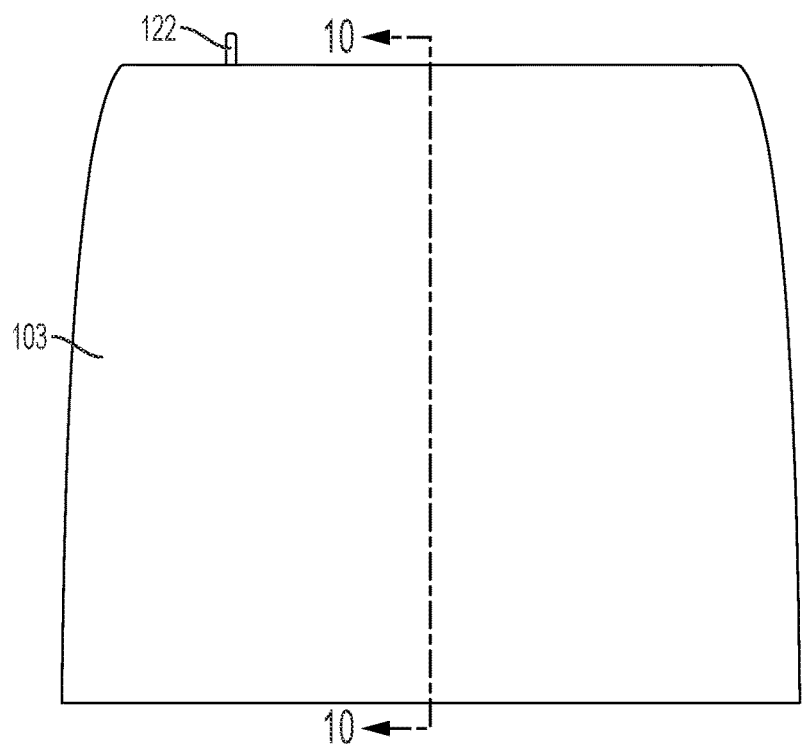
FIG. 4 depicts an alternative side view of an exemplary embodiment of a hydroponic unit.

As shown in FIG. 1, there is an external surface 101 to the unit 100, on which there is a cord cover 115. There are cover plates 119 and a fluid level indicator 122. FIG. 2 depicts an alternative view of the same unit as shown in FIG. 1. In FIG. 2, the bottom 102 of the container is visible, as is the interior surface 104 of the outside wall of the container. FIG. 3 is a side view of the round embodiment of the hydroponic unit, illustrating external wall 103 and a fluid level indicator 122 extending above the top height of the container. FIG. 4 illustrates another side view of the round embodiment of the hydroponic unit. The bottom, or base, of the hydroponic unit as a whole is wider than the top for improved stability.

Figure 5:
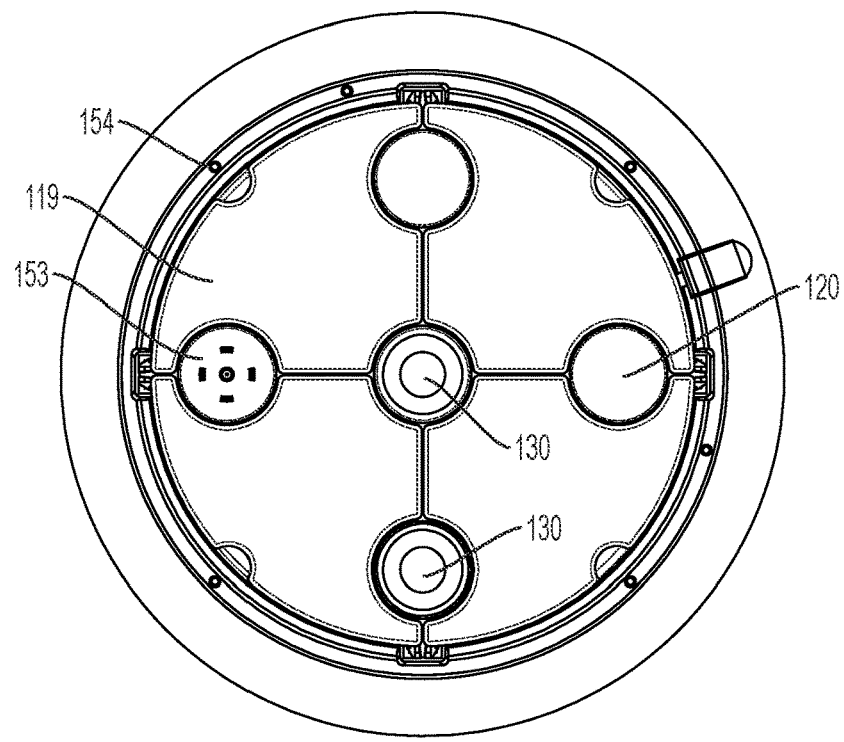
FIG. 5 depicts a top view of an exemplary embodiment of a hydroponic unit, with cover plates in place.

FIG. 5 illustrates a top view of a round embodiment of the hydroponic unit, and depicts four cover plates 119, plugs 120, baskets 130, and a plug to a fluid level indicator 153. Six holes 154 may be positioned around a top perimeter of the hydroponic unit provide a place for ends of tomato cages to be placed into, to help support larger sized plants. The six holes are positioned such that standard three prong tomato cages can be used, or standard four prong tomato cages can be used.

Figure 6:
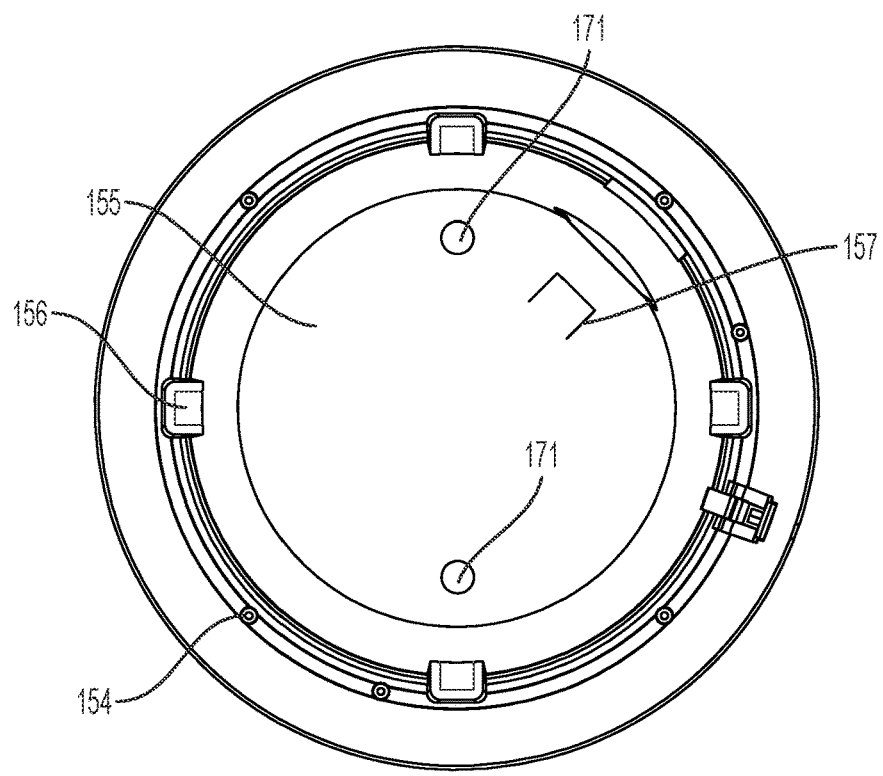
FIG. 6 depicts another top view of an exemplary embodiment of a hydroponic unit, without cover plates or support structure.

FIG. 6 illustrates a top view of a round embodiment of the hydroponic unit when there are no cover plates or support structures placed within it. The bottom inside surface 155 of the fluid reservoir is visible in FIG. 6. Openings 154 are visible around the perimeter of the top of the container. Also visible are notches 156 which provide a place for the support structure 116 to fit into. The bottom inside surface of the fluid reservoir also contains protrusions 171 and pump housing 157.

Figure 7:
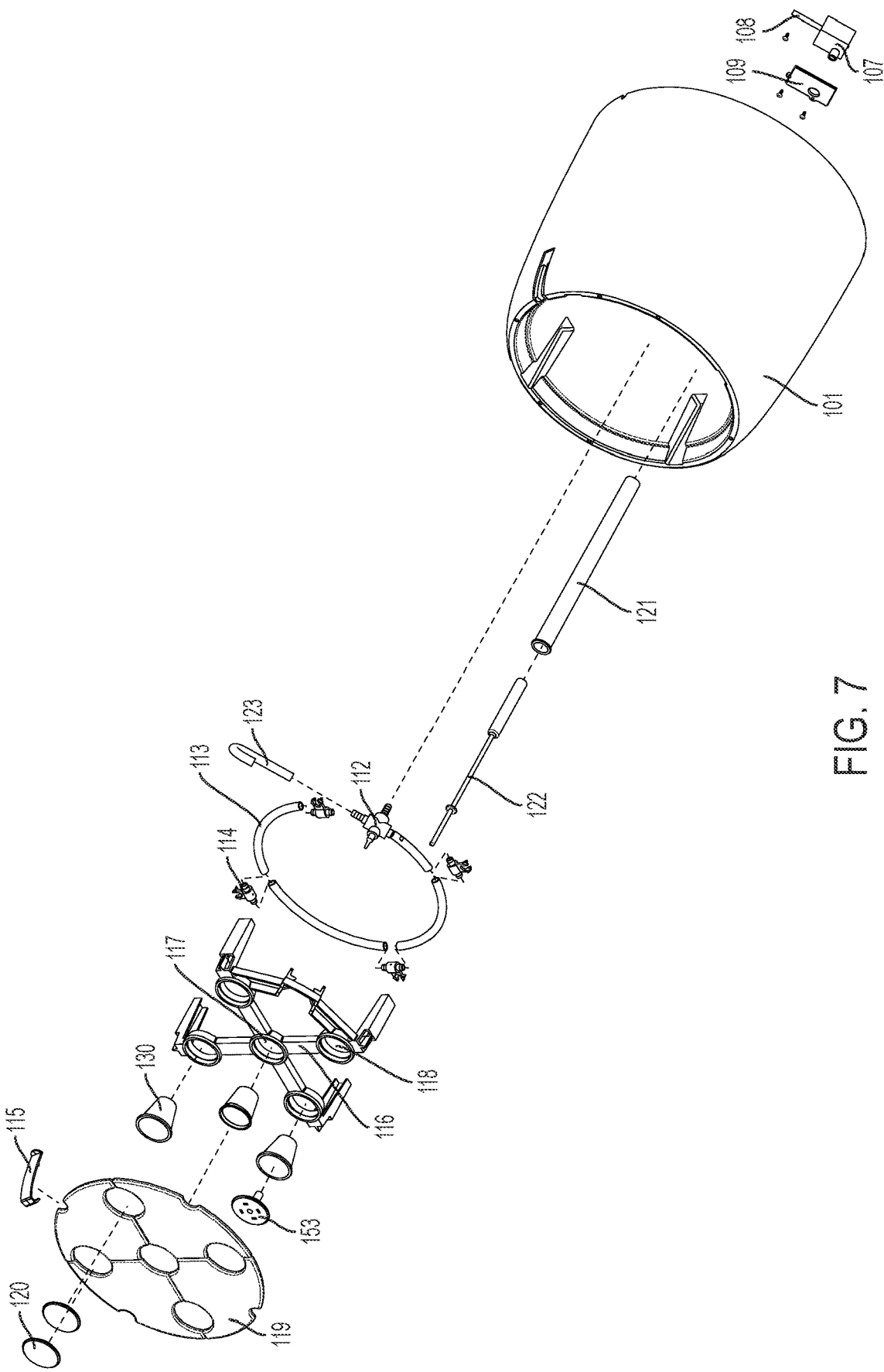
FIG. 7 depicts an exploded view of an exemplary embodiment of a hydroponic unit.

FIG. 7 illustrates an exploded view of an exemplary embodiment of a hydroponic unit and its components, which are described in detail below.

Figure 8:
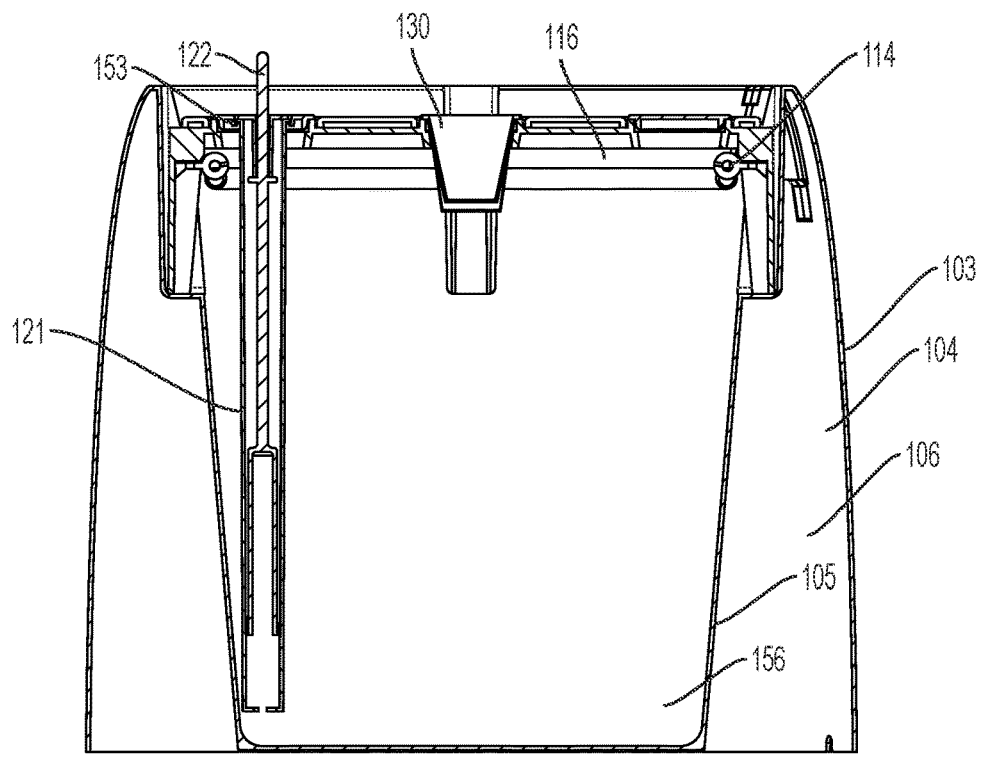
FIG. 8 depicts a vertical cross sectional view of the exemplary embodiment of a hydroponic unit illustrated in FIG. 3.

FIG. 8 illustrates a side cross section view taken from a cross section of FIG. 3. In FIG. 8, a fluid level indicator tube 121 extends from a bottom of a fluid level indicator plug 153. The fluid level indicator tube and the fluid level indicator plug may be consolidated into one piece or may be separable from each other for cleaning and repositioning of the fluid level indicator and its plug. The fluid level indicator 122 is positioned within the fluid level indicator tube and extends upward from the fluid level indicator plug.

Also visible in FIG. 8 is an exemplary embodiment of a basket 130 and a support structure 116. FIG. 8 depicts the locations of an internal volume 106 between an external surface 105 of the inner wall and the internal surface 104 of the outer wall 103.

Figure 9:
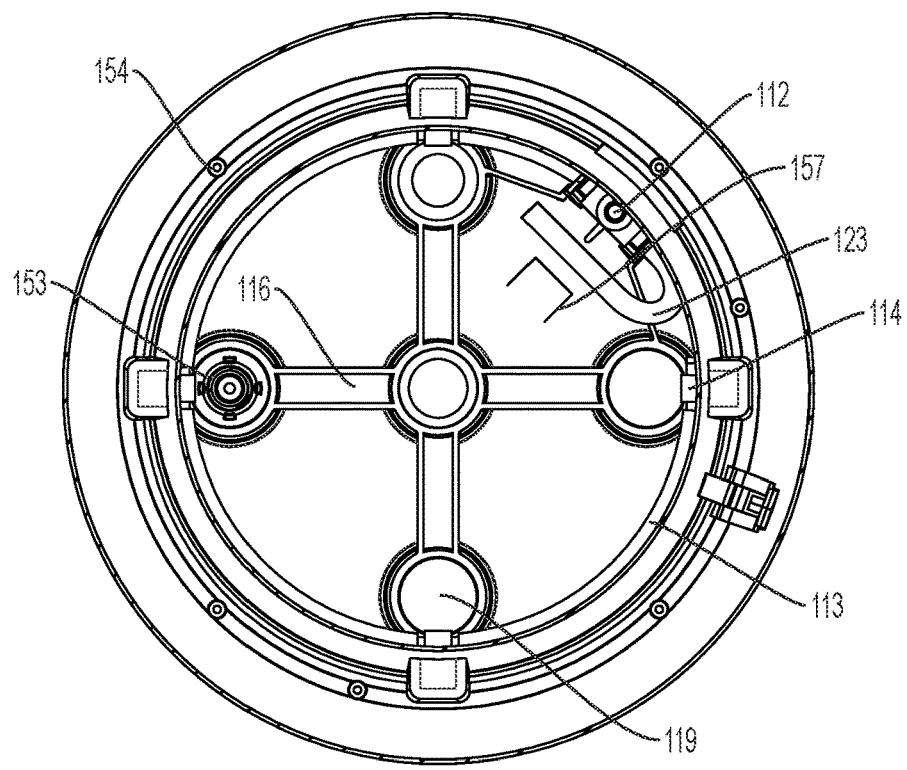
FIG. 9 depicts a horizontal cross sectional view of the exemplary embodiment of a hydroponic unit illustrated in FIG. 3.

FIG. 9 illustrates another cross section of the container in FIG. 3. In FIG. 9, a drain tube 123 and valve 112 are visible, along with pieces of tubing 113 and jets 114 which connect the pieces of tubing to each other. The tubing can be a ⅜ inch diameter tubing, or other diameters as appropriate for the size of the corresponding jet sprayers. As a unit, the tubing, jets, and valve can be lifted out of the container as one piece, for ease in cleaning and assembly.

Figure 10:
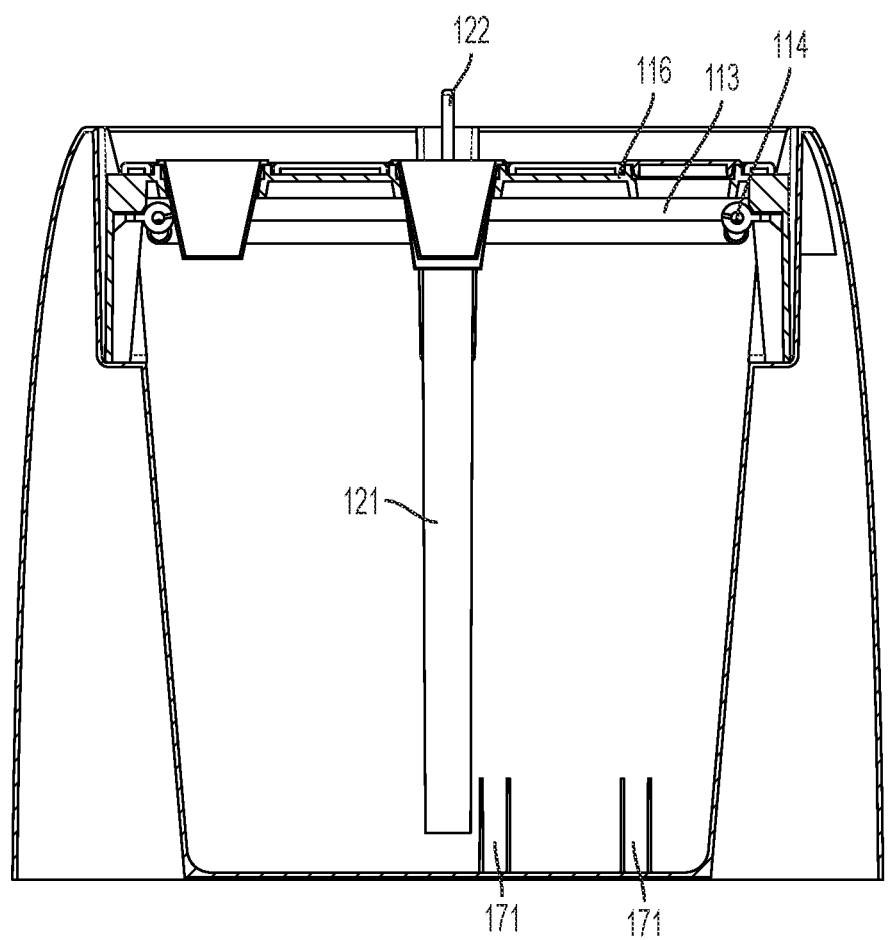
FIG. 10 depicts another vertical cross sectional view of the exemplary embodiment of a hydroponic unit illustrated in FIG. 4.

FIG. 10 depicts a cross section of the container as shown in FIG. 4. In FIG. 10, jets 114, a fluid level indicator tube 121, and a fluid level indicator 122 are depicted. FIG. 10 also shows two protrusions 171 (also depicted in FIG. 6). Protrusions 171 are stake-holders should a user desire to use wooden or other heavy-duty stakes to support the growth of a larger plant in the center basket. The protrusions are aligned on the base of the fluid reservoir such that the stakes would extend upward out of two of the peripheral openings in the support structure. The protrusions are located under the openings in the support structure, and may be located under any two periphery openings or a periphery opening and the center opening. According to exemplary embodiments, the protrusions may be offset from the center of the openings to allow for the fluid level indicator to be inserted fully without interference from the protrusions. The protrusions may be any shape, such as cylindrical, square, hexagonal, or triangular, etc. Protrusions 171 may also be used to hold lights or light poles should the user desire to provide lighting for the plant being grown in a basket in the central opening. Other accessories could also be attached to the hydroponic growing unit, either by using the tomato cage holes, or by using the protrusions.

Figure 24:
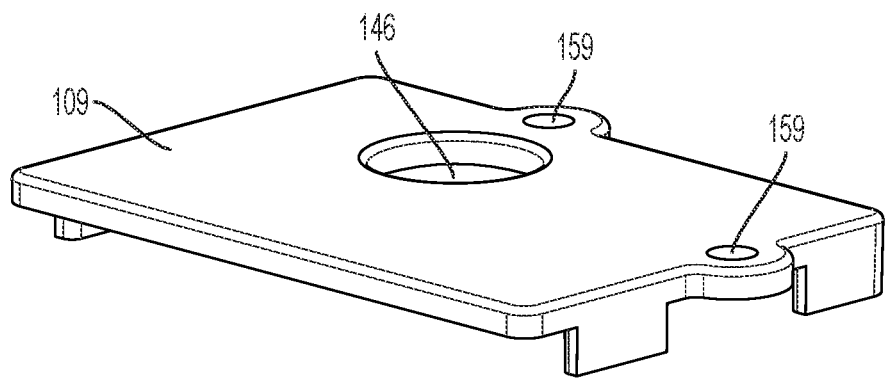
FIG. 24 depicts a pump cover in accordance with an exemplary embodiment of a hydroponic growing unit.

The bottom of the fluid reservoir has a pump housing 157, as shown from a top-view in FIG. 6. The pump housing may consist of three walls, which may be solid walls, in a shape and size sufficient for a pump to be placed within it. The space where a fourth wall would go may remain empty so that a pump intake remains unobstructed when a pump is placed within the pump housing. FIG. 24 illustrates a roof 109 for the pump housing, which has an opening 146 for the fluid output tube 146.

Figure 11:
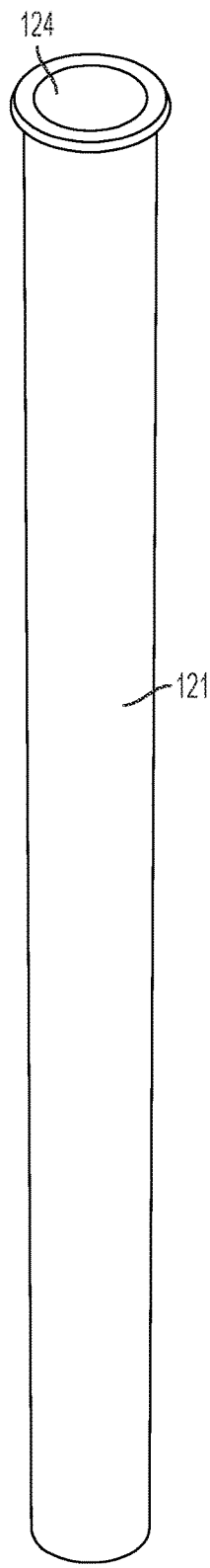
FIG. 11 depicts a fluid level indicator tube in accordance with an exemplary embodiment of a hydroponic unit.
Figure 12:
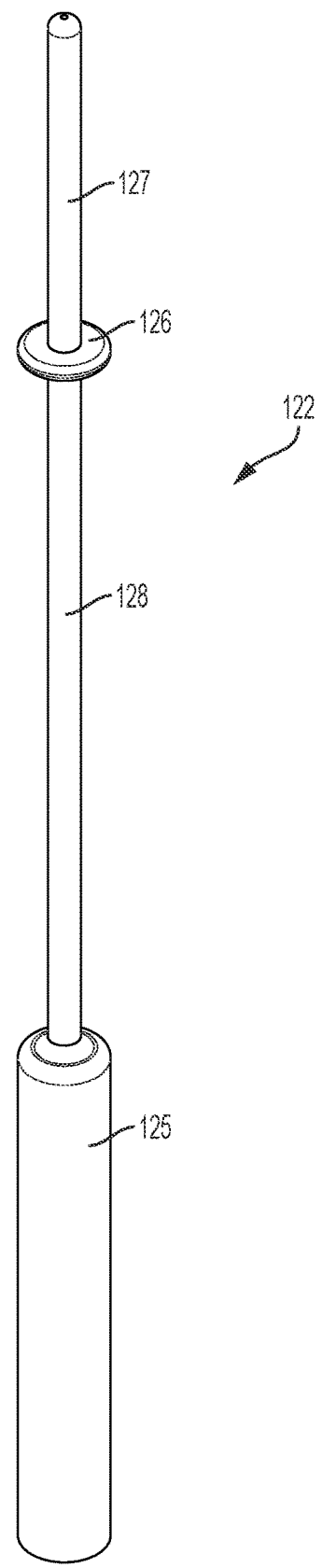
FIG. 12 depicts a fluid level indicator associated with a fluid level indicator tube in accordance with an exemplary embodiment.

FIGS. 11 and 12 illustrate the fluid level indicator apparatus. This consists of an elongate tube 121 with an opening at the top 124. Another component, a fluid level indicator 122, is placed within the tube 121. The fluid level indicator may have a top end 127, a stopper or plug 126 which may be positioned in an opening of support structure 116, a central length portion of the fluid level indicator 128, and a base 125. The fluid level indicator 122 is placed into the tube 121. Together, this can be placed into any one of the openings of the support structure. Thus, the fluid level indicator is moveable or positionable within the hydroponic unit. The fluid level indicator can be placed into the central opening of the support structure if the user desires to grow one to four smaller plants in the four openings closer to the perimeter of the support structure. The fluid level indicator can also be placed into any one of the four openings closer to the perimeter of the support structure if the user desires to grow one larger plant in the central opening. Or, the user can place the fluid level indicator into one of the peripheral openings and place plant baskets into one or more of the other three peripheral openings.

The fluid reservoir has a volume large enough to hold at least 6 gallons of fluid. According to exemplary embodiments, the fluid may be water. In various embodiments, the fluid may be a liquid solution containing nutrients to support plant growth. It can be in a variety of volumes, ranging from 5 gallons to 12 gallons. The fluid reservoir can hold a depth of fluid of 12 inches. The diameter of the fluid reservoir can be 18.5 inches at the base, and 16 inches in height. The fluid level indicator indicates to the user how high the water level is from the bottom of the fluid reservoir. Element 125 is a float that helps to position the bottom of the fluid level indicator. The top 127 of the fluid level indicator sits above the plug 126. Element 127 is 1.5 inches long (or tall) in an exemplary embodiment. Element 128 extending below 127, along with 127, and stopper 126, change height according to the fluid level. The deeper the fluid level, the higher these elements stick out of the top of the fluid level indicator tube 121. As the fluid level lowers, elements 127, 126, and 128 drop in height. Once the fluid in the reservoir is at 2 gallons, the stopper 126 is low enough to interfere with the plug 126. The plug prevents the stopper from dropping any lower, even as the fluid level continues to decrease.

Figure 13:
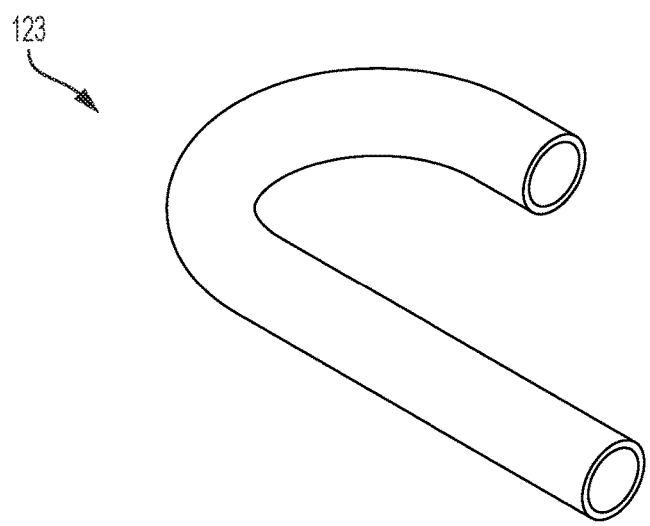
FIG. 13 depicts a drain tube in accordance with an exemplary embodiment of a hydroponic unit.

FIG. 13 illustrates a drain tube 123. This piece of tubing may be J-shaped, straight, or have any other curvature to it. One opening of the drain tube is connected to the valve 112, and the other end of the tube remains unattached. This unattached end is placed over the side of the hydroponic unit when the fluid reservoir is to be drained.

Figure 14:
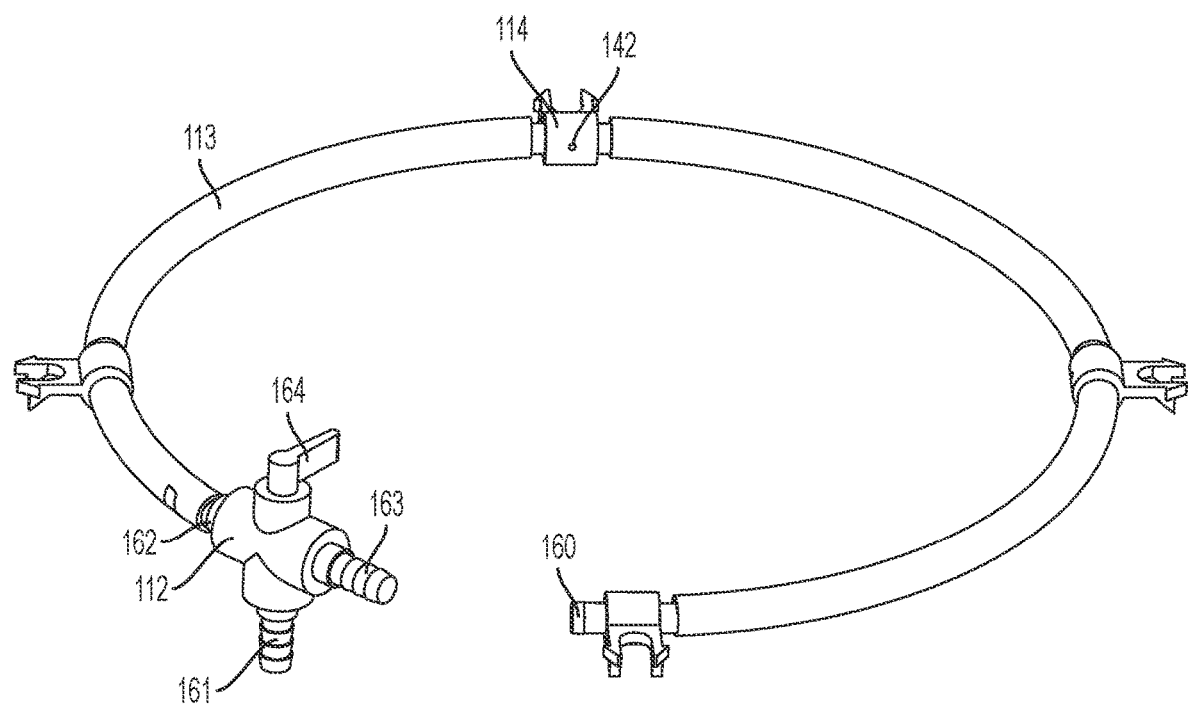
FIG. 14 depicts a set of tubing, jet sprayers, and a valve in accordance with an exemplary embodiment of a hydroponic unit.
Figure 15:
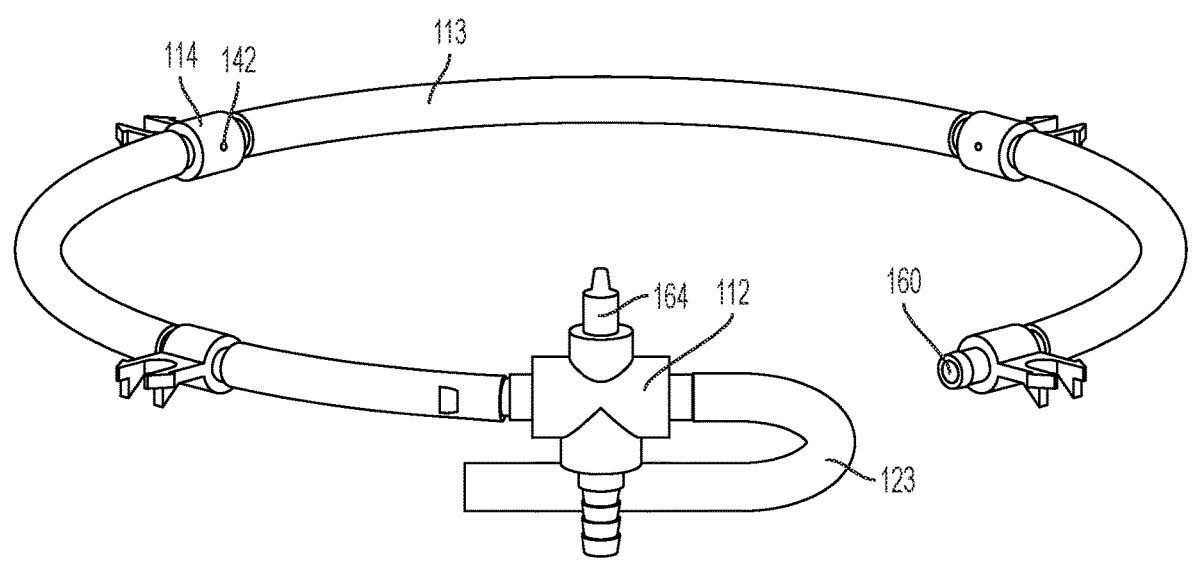
FIG. 15 depicts another view of tubing, jet sprayers, a valve, and a drain tube in accordance with an exemplary embodiment of a hydroponic unit.

FIGS. 14 and 15 illustrate the tubing 113, the jets 114, and the valve 112. In an exemplary embodiment there are four pieces of tubing that are curved and positioned in a circular formation. The pieces of the tubing are connected by jets 114. The input end of a first piece of tubing has the valve 112 with a valve handle 64, a fluid input 161 and two fluid outputs 162 and 163 connected to it. There is also a cap 160 at the end of the jet at the end of the last piece of tubing which acts as a plug.

Figure 16:
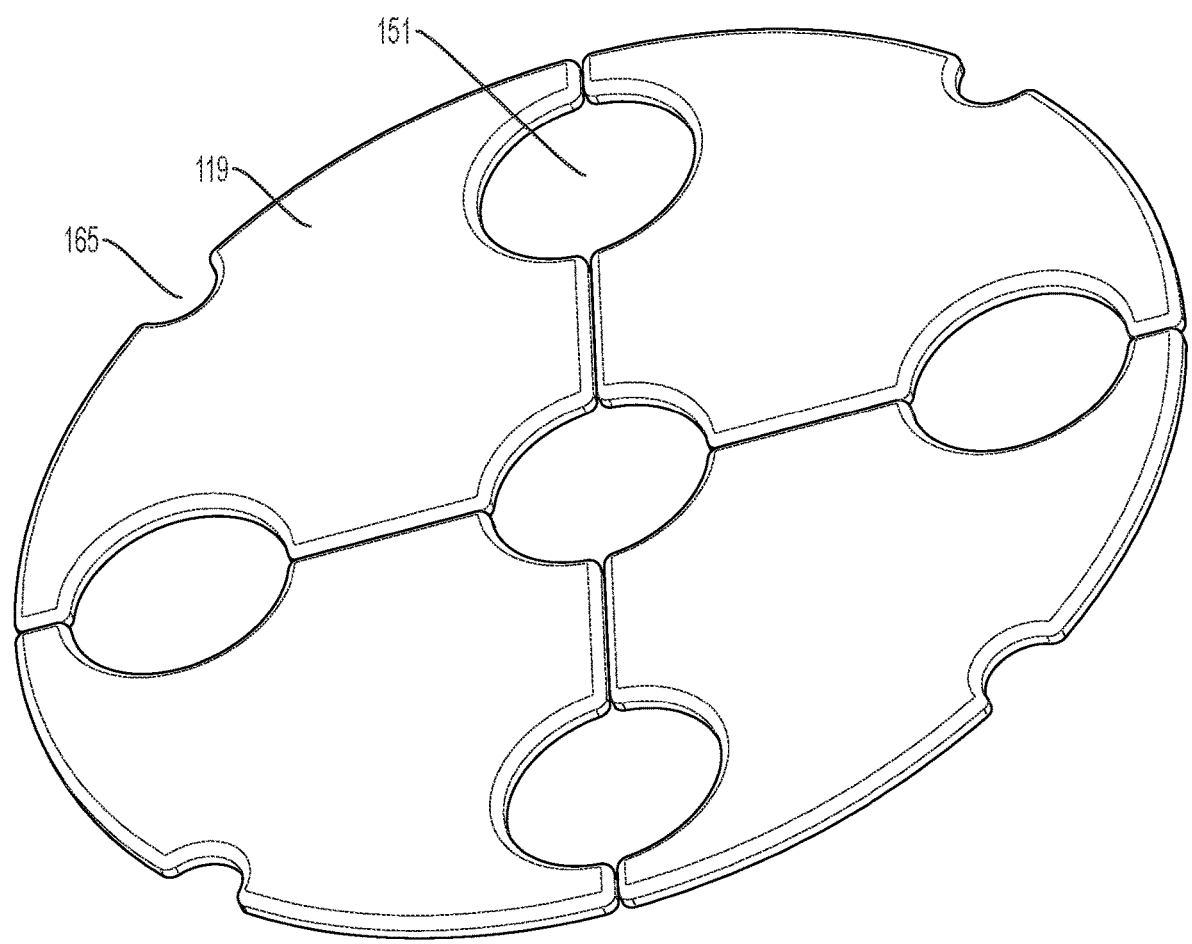
FIG. 16 depicts a perspective view of cover plates in accordance with an exemplary embodiment of a hydroponic growing unit.
Figure 17:
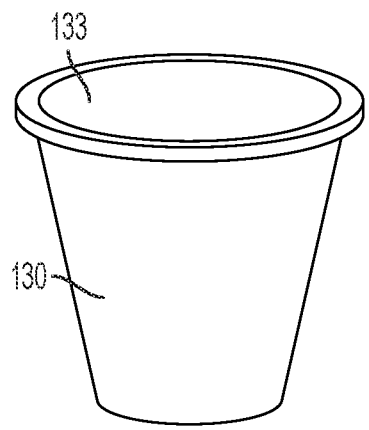
FIG. 17 depicts an exemplary embodiment of a basket in accordance with an exemplary embodiment of a hydroponic growing unit.

FIG. 16 illustrates the cover plates. In an exemplary embodiment, there are four cover plates 119. Each cover plate has indentations in it to create openings 151 in which the baskets or plugs sit. There are also indentations in the outer circumference of the cover plates 119. These indentations are finger indents 165, which allow the user to pull the cover plate up.

Figure 18A:
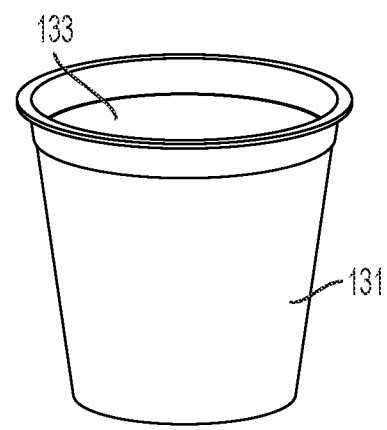
FIGS. 18A, 18B, and 18C depict an exemplary embodiment of a basket in accordance with an exemplary embodiment of a hydroponic growing unit.
Figure 18B:
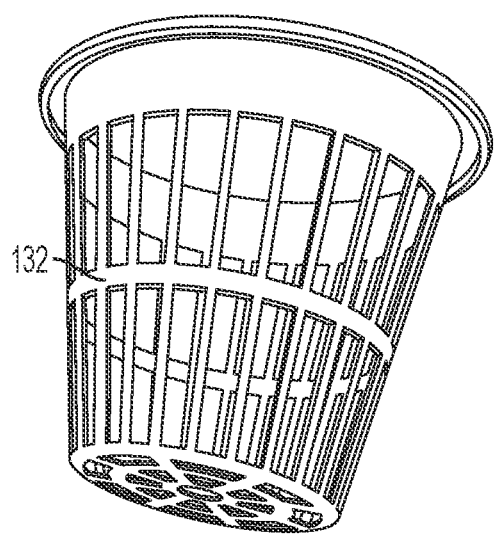
Figure 18C:
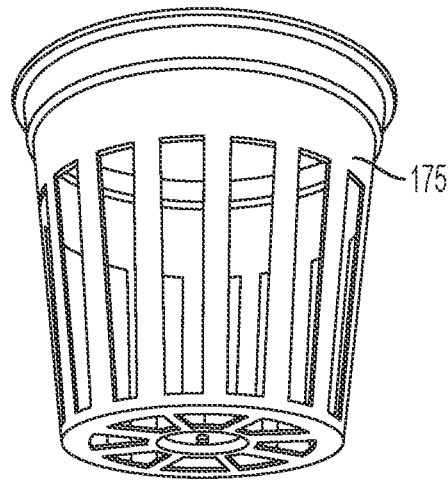

FIGS. 17, 18A, 18B and 18C illustrate different embodiments of baskets. FIG. 18B illustrates a first exemplary embodiment, with a basket-weave type of structure with openings. The baskets can be filled with a growing medium. Growing mediums can include a sponge-like growing medium, coconut core peat moss, peat, or any other commercially available seed starter material to enable rapid rooting of a plant. In use, a plant is already started growing before it is placed in to the hydroponic growing unit. This plant seedling, which may be in a small plant starter size amount of growing medium, can be placed into rooting media placed into a net cup, or basket. Other uses include placing seeds before they have grown, or at any stage of germination, into the rooting media.

Located and housed within the outer shell 173 is the rooting media 172 which provides a substrate in which the seed will grow. The rooting media 172 may be made of a variety of materials. These might include, for example, coir (compressed, non-compressed, screened, coir dust, and/or coir pith), peat, peat moss (for example, sphagnum peat moss), peat humus, vermiculite, compost perlite, bark, bark fines, composted bark fines, wood shavings, saw dust, mulch, a modified cornstarch, corn stover, sunflower stem, composted rice hulls, reed sedge peat, composted manure, composted forest products, coffee grounds, composted paper fiber, digested manure fiber, composted tea leaves, bagasse, yard waste compost, cotton derivatives, wood ash, bark ash, vegetative by-products, agricultural by-products, or combinations thereof. In other embodiments, the rooting media may include fertilizers or fertilizing agents. These materials may also be formed and/or molded into a solid form. In an embodiment, the rooting media 172 is molded into a cone, acorn, triangular acorn, flower pot, or spike form. In another embodiment, the rooting media 172 is the Q-PLUG® or EXCEL-PLUG® manufactured and sold by International Horticultural Technologies, Inc. Hollister, Calif. 95024. In another embodiment, the Q-PLUG® or EXCEL-PLUG® is molded and shaped into a cone, acorn, triangular acorn, flower pot, or spike shape. In another embodiment, the molded and/or formed rooting media 172 is adapted to fully or partially fill the interior space defined by the outer shell. Thus, in one embodiment, the rooting media 172 may be formed or shaped into a truncated cone, spike, acorn, triangular acorn, or flower pot such that it leaves a void at the bottom interior space of the outer shell 173. Similar to the outer shell 173, the components of the rooting media 172 may be derived from natural or organic sources. As such, plants or vegetables that are produced from the seed pods 100 may be classified and rated as organic.

Figure 19:
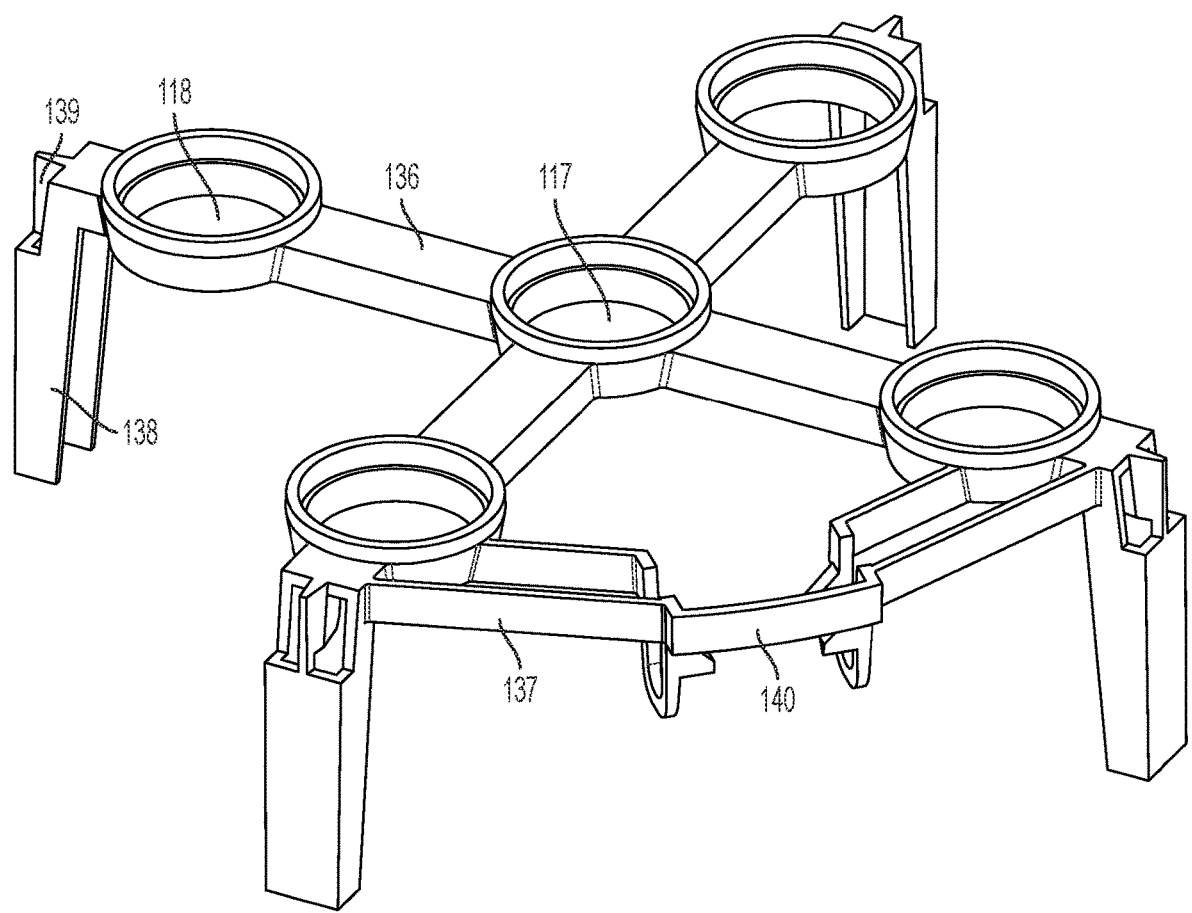
FIG. 19 depicts a perspective view of a support structure in accordance with an exemplary embodiment of a hydroponic growing unit.
Figure 20:
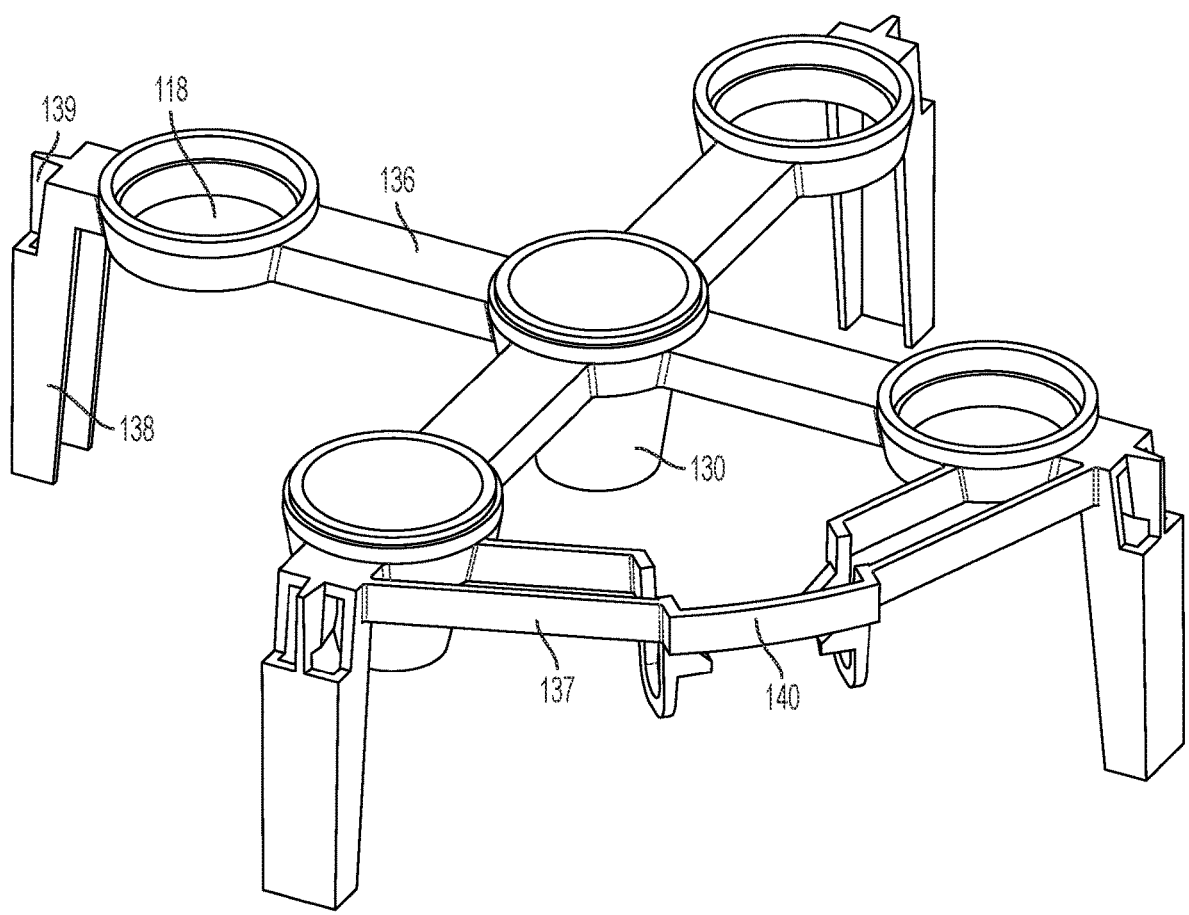
FIG. 20 depicts a perspective view of a support structure and baskets in accordance with an exemplary embodiment of a hydroponic growing unit.

FIGS. 19 and 20 illustrate the support structure 117. The support structure is made of interior horizontal support beams 136, exterior horizontal support beams 137, vertical support beams 138, notches 139, valve indentation 140, a central opening 117 and peripheral openings 118, located as shown in FIGS. 19 and 20. The central and peripheral openings are sized for placing baskets 130, 131, 132, or 175 into them. Openings 117 and 118 also have a shell 166 molded into them, to allow a large variety of commercially available baskets to fit into and remain supported by the support structure. In an exemplary embodiment, the shell is molded into each of the openings, however in alternative embodiments, the shell may be a separate piece of material fixed or otherwise positioned in the openings. It may be removable or fixed. The notches 139 allow the support structure to fit into place on the inside of the fluid reservoir, near the top of the reservoir. The support ring may fit into the reservoir at a location sufficient to allow the roots of plants to grow downward towards the bottom of the reservoir. Indentation 140 provides a secure location for the valve to be positioned. The support structure also adds additional hoop strength to the hydroponic growing unit. FIG. 20 illustrates the openings with a basket in place. In an exemplary embodiment, the basket may be any basket with a basket weave structure or other structure with openings in it such as that displayed in FIG. 18B.

Figure 21:
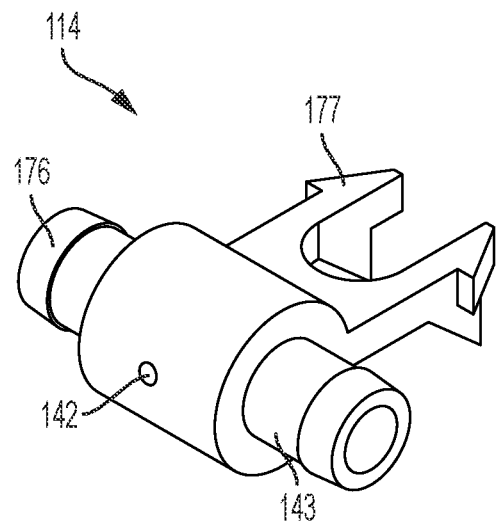
FIG. 21 depicts a jet sprayer in accordance with an exemplary embodiment of a hydroponic growing unit.

FIG. 21 is a detailed view of a jet 114. The jet 114 has an inlet tubing connection 143 and an outlet tubing connection 176. The jet also has a snap piece 177 which has two notches and a cut-out section, as illustrated in FIG. 21, to snap the jets into additional indentations on the inside wall of the fluid reservoir, positioned below the support structure, to hold the jets, and thus the tubing connected to the jets, in place. Each jet 114 has a sprayer hole 142 through which fluid exhausts when fluid is moving through the jets.

Figure 22:
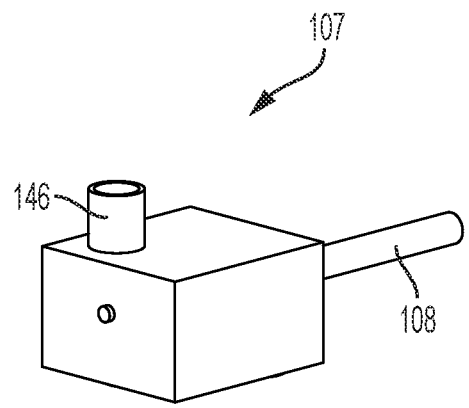
FIG. 22 depicts a pump in accordance with an exemplary embodiment of a hydroponic growing unit.

FIG. 22 is the pump 107, which is positioned within the pump housing on the bottom surface of the fluid reservoir. The pump has an electrical cord 169 for connectivity to a power source. The pump may be a commercially available pump, such as that found in an aquarium store. The pump has a fluid intake 145, which in an exemplary embodiment is a grate with a filter on it, on one of the vertical surfaces of the pump. The pump also has a fluid output 146 which is connected to the lower end of a tube 111 of which the upper end is connected to a valve input 161.

Figure 30:
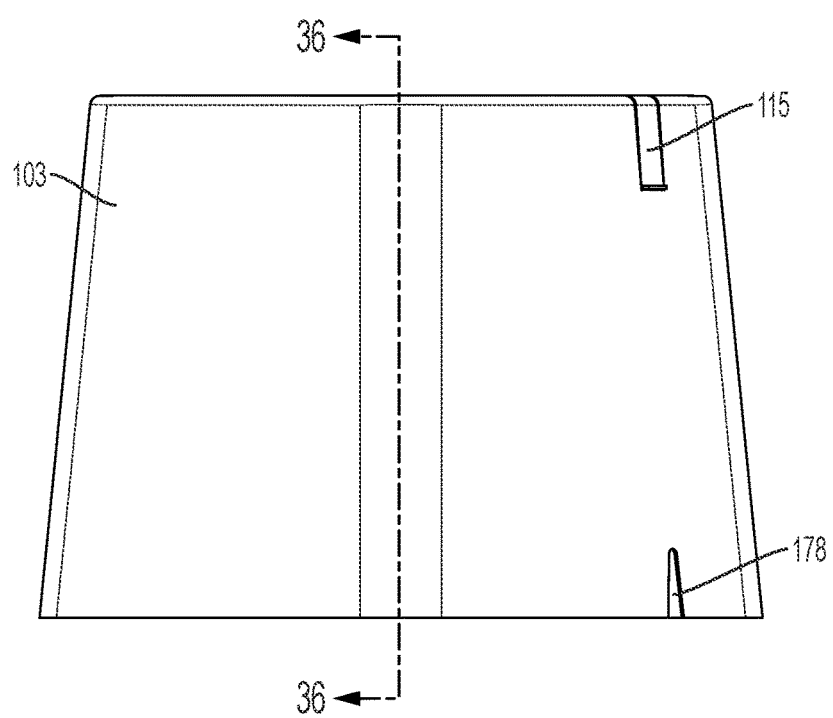
FIG. 30 depicts an alternative side view of an exemplary embodiment of a hydroponic unit.
Figure 31:
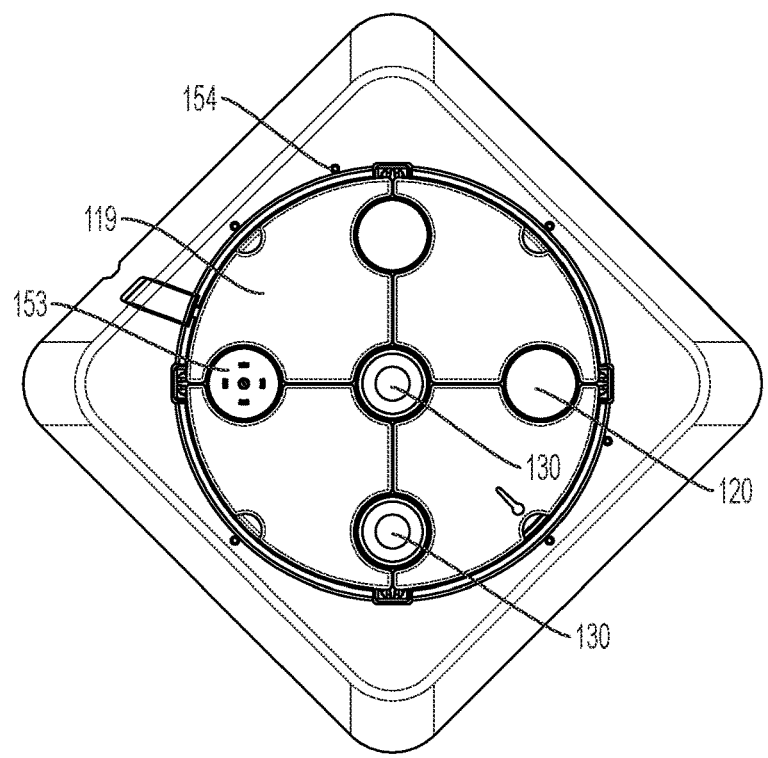
FIG. 31 depicts a top view of an exemplary embodiment of a hydroponic unit.
Figure 32:
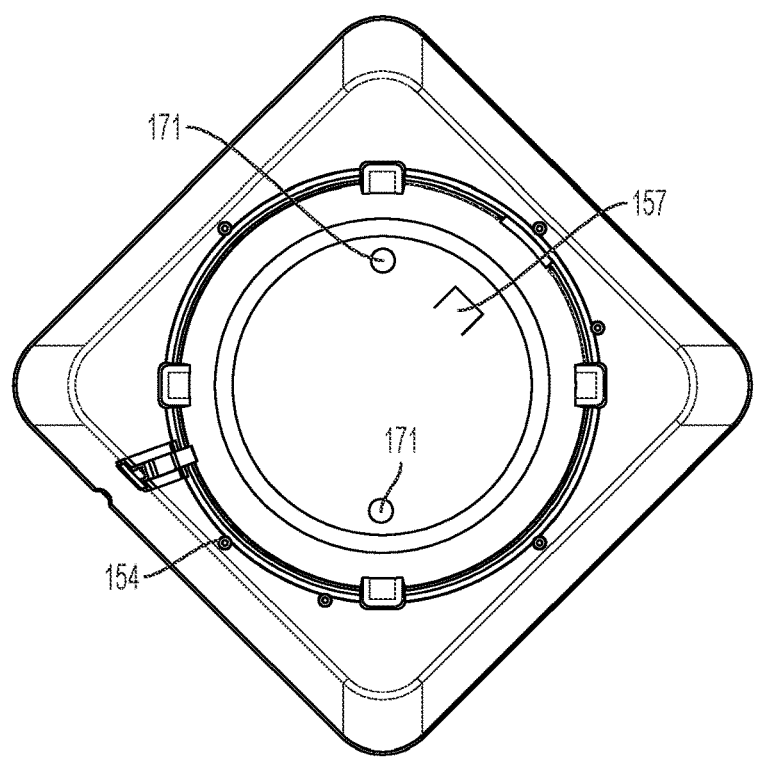
FIG. 32 depicts a top view of an exemplary embodiment of a hydroponic unit.
Figure 33:
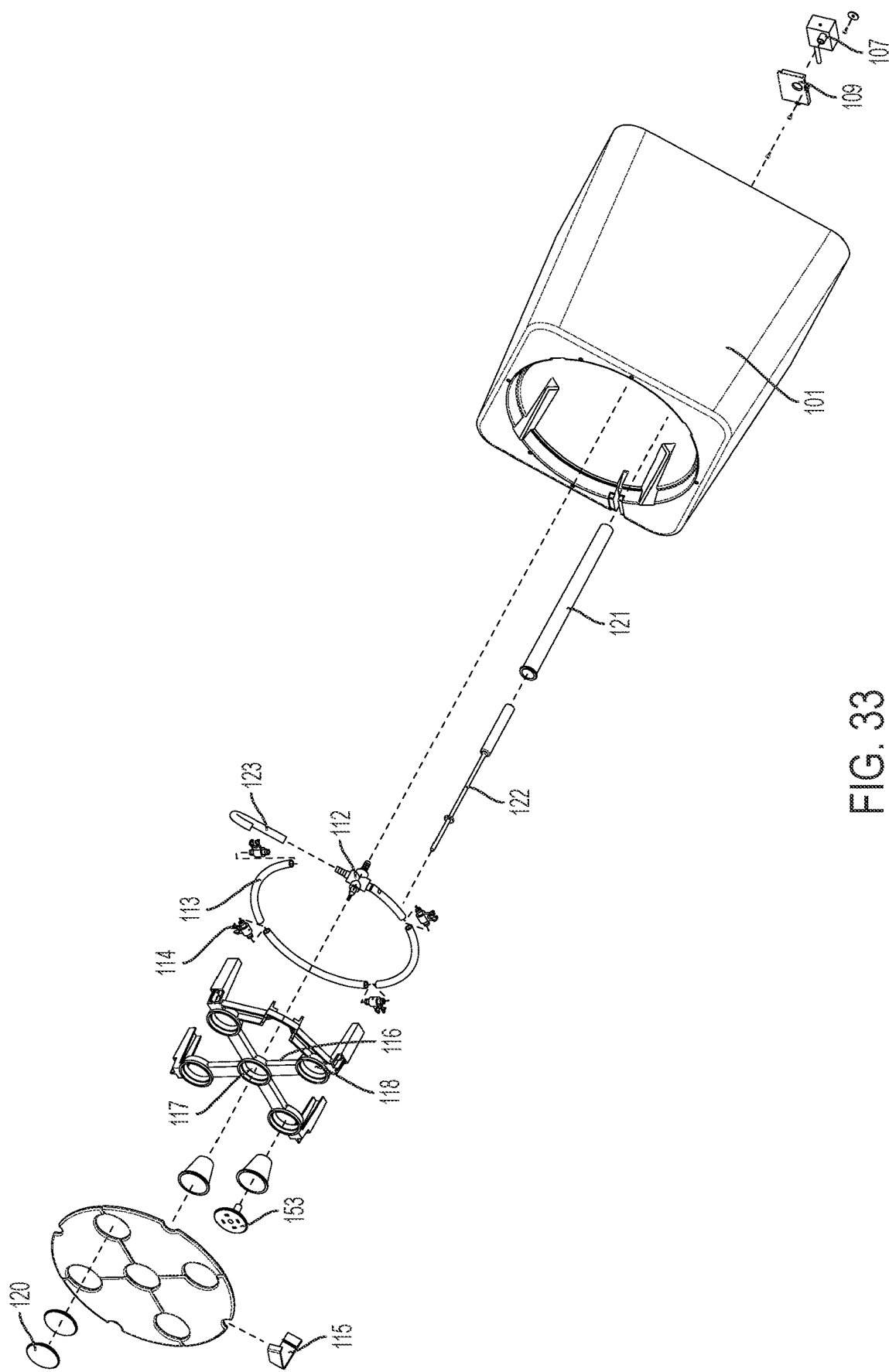
FIG. 33 depicts an exploded view of an exemplary embodiment of a hydroponic unit.
Figure 34:
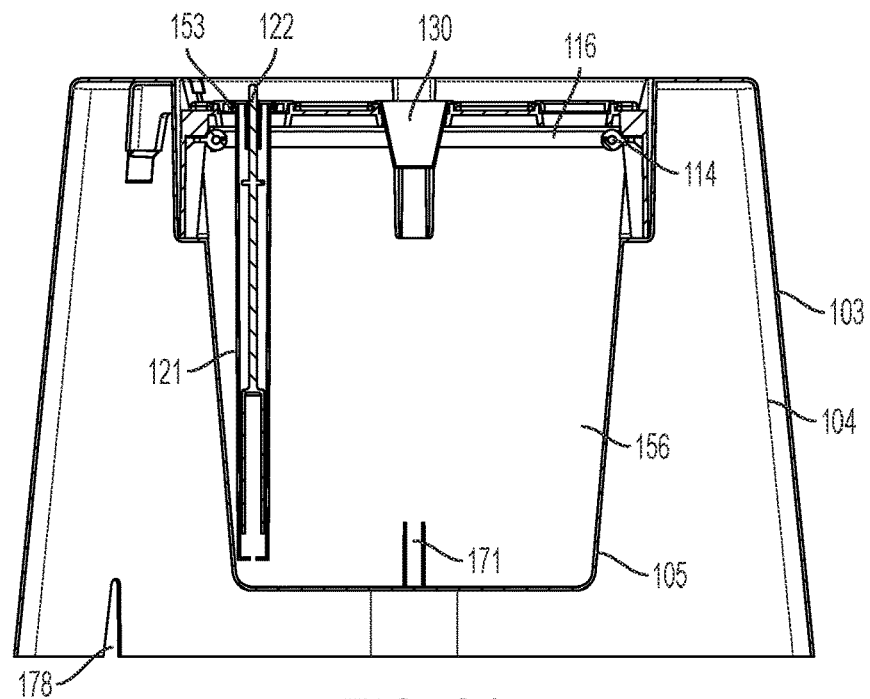
FIG. 34 depicts a vertical cross sectional view of the exemplary embodiment of a hydroponic unit illustrated in FIG. 29.
Figure 35:
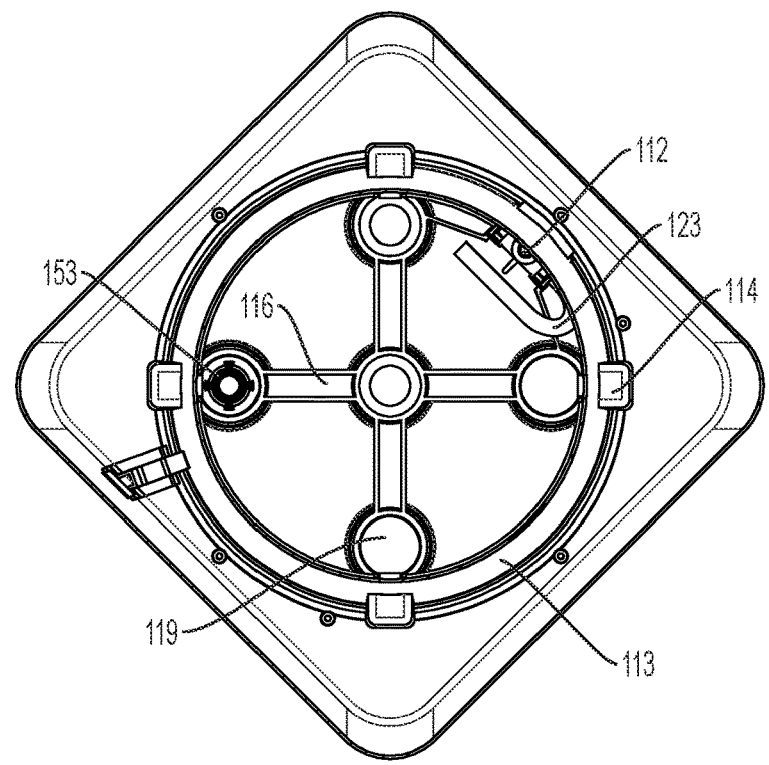
FIG. 35 depicts a horizontal cross sectional view of the exemplary embodiment of a hydroponic unit illustrated in FIG. 29.
Figure 36:
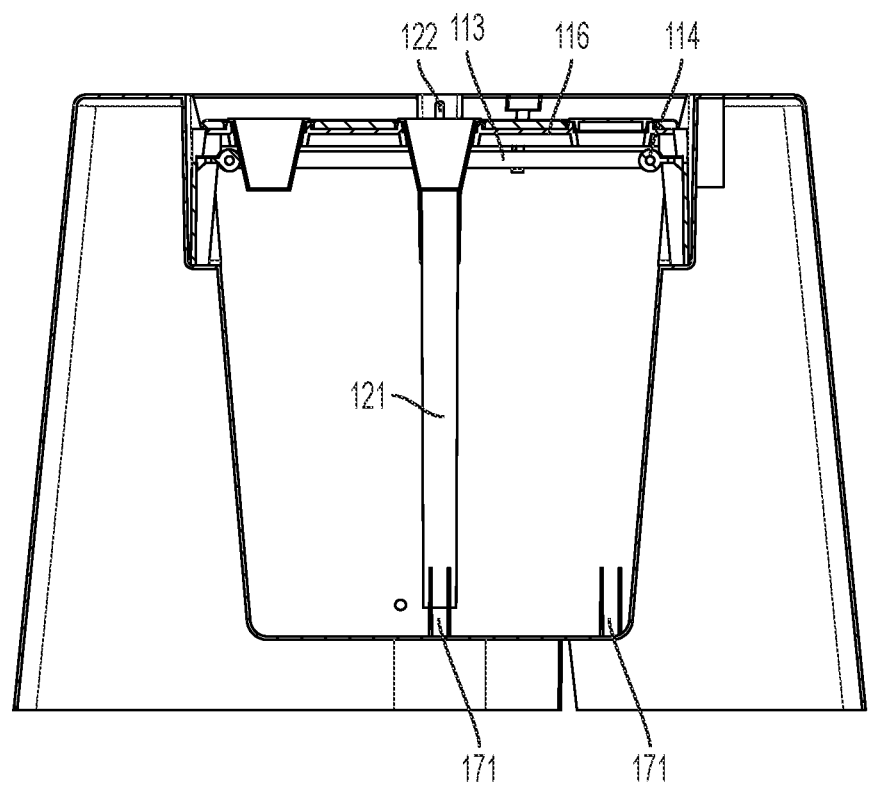
FIG. 36 depicts another vertical cross sectional view of the exemplary embodiment of a hydroponic unit illustrated in FIG. 30.

The cord 169 extends from the pump 107, and runs up toward the top of the fluid reservoir. Underneath cord cover 115 is an opening for the cord 169 to run through. The cord then is run in a downward manner towards the bottom of the hydroponic unit, in the internal volume 106 of the unit. The cord then exits the unit through cord exit opening 178 (visible in FIG. 30) and can be plugged in to an electrical outlet to power the pump. In an exemplary embodiment of the use of the hydroponic unit, the pump may never be turned off, as plants growing within the unit may not survive very long without the aeration of the fluid performed by the pump, in addition to its function as a pump to spray the fluid out of the jets.

Figure 23:
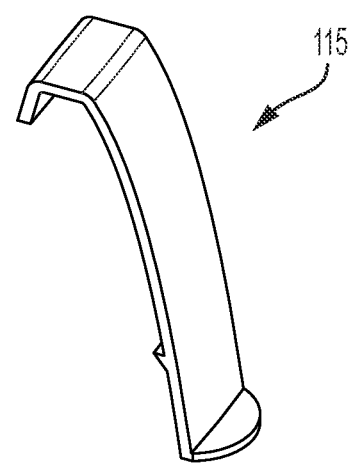
FIG. 23 depicts a cord cover in accordance with an exemplary embodiment of a hydroponic growing unit.

FIG. 23 illustrates the cord cover 115, independently from the rest of the unit. It has a shaped top portion to match the shaper of the top perimeter of the hydroponic growing unit, and a protrusion at the bottom to allow a user to easily lift the cord cover up.

FIG. 24 illustrates an exemplary embodiment of a pump housing cover or roof 109 having an opening 170 for pump output 146, and screw holes 159 to hold the cover in place onto the walls of pump housing 157.

Figure 25:
FIG. 25 depicts a plug for the openings in the support structure in accordance with an exemplary embodiment of a hydroponic unit.

FIG. 25 illustrates an exemplary embodiment of a plug 120 to fit into openings 117, 118 when that opening is not being used to hold a basket and grow a plant. This plug 120 is useful because it, along with the cover plates, blocks out light from the fluid reservoir, and helps reduce growth of algae in the fluid reservoir.

Figure 26:
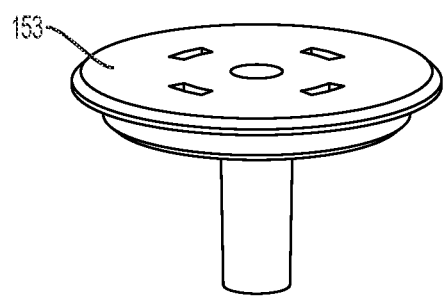
FIG. 26 depicts a component of a fluid level indicator in accordance with an exemplary embodiment of a hydroponic unit.
Figure 27:
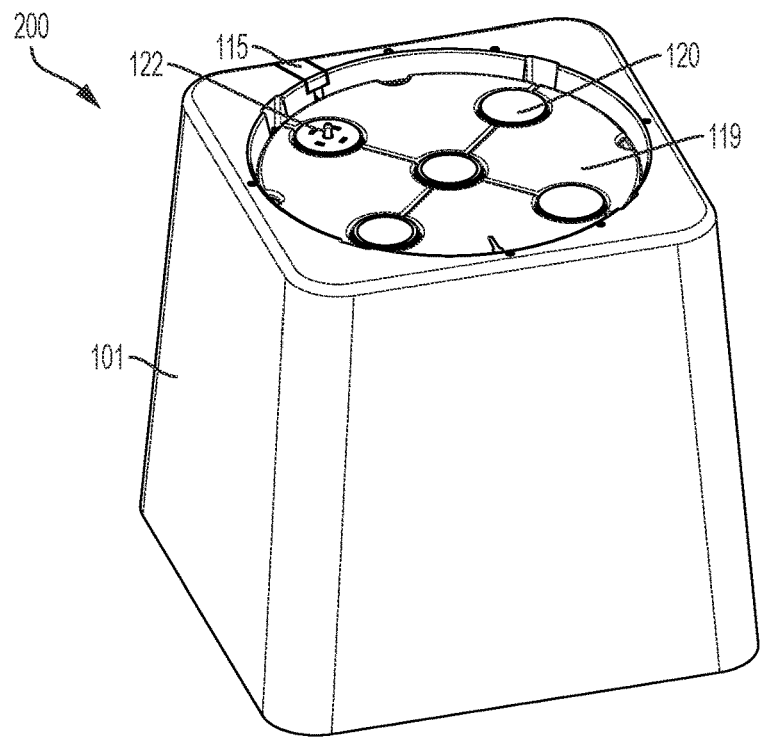
FIG. 27 depicts a perspective view of a second exemplary embodiment of a hydroponic growing unit.
Figure 28:
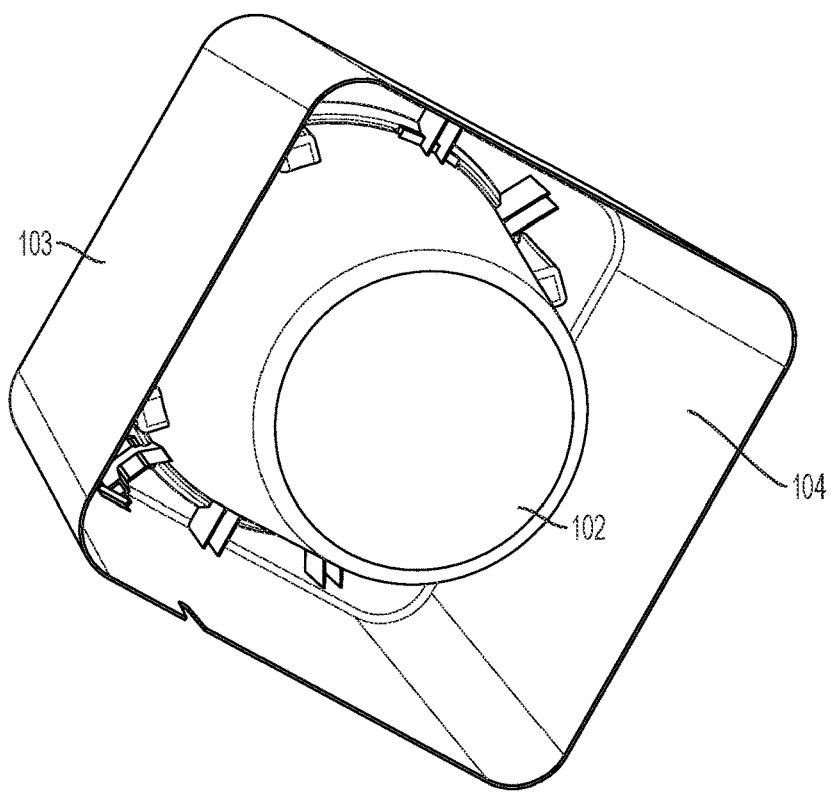
FIG. 28 depicts another perspective view of the second exemplary embodiment of a hydroponic growing unit.
Figure 29:
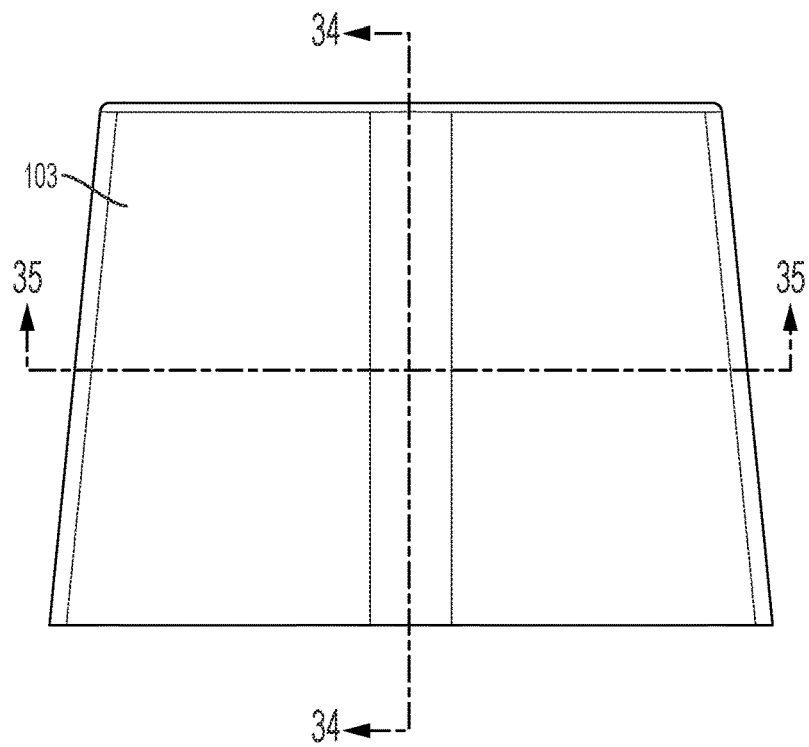
FIG. 29 depicts a side view of an exemplary embodiment of a hydroponic unit.

FIG. 26 illustrates a component similar to the plug of FIG. 25, which is used to hold the fluid level indicator and tube in place in one of the openings 117, 118.

FIGS. 27-36 illustrate another exemplary embodiment of a hydroponic growing unit 200. The components and arrangement of components are all similar to those in the first exemplary embodiment, but the shape of the outer housing of the second exemplary embodiment is square in nature with rounded corners. The component numbers used in this embodiment correspond to those described above.

Operation of the hydroponic growing unit will now be described. First, the reservoir is filled with fluid, for example, water. Suitable plant material for growth is placed into one or more baskets that placed in the unit in the respective openings in the cover which are over the openings in the support structure. The unit is plugged in (that is, the cord for the pump is plugged in to allow the pump to receive power). When the pump is powered on, the pump intakes fluid through its fluid intake 145, and is output through the pump exhaust outlet 146 into a tube 111 up towards the valve 112. The valve may be turned from the "off" position to the "on" position to allow for fluid flow through the apparatus. The handle of the valve faces the direction the fluid is permitted to flow. From the "off" position, the valve handle is turned counter-clockwise to turn the valve "on." When the valve is in the "on" position, the fluid enters the valve through valve inlet, then exits the valve in the tubing which is connected to the valve. The fluid circulates through the tubing pieces and jet sprayers, until, at the last piece of tubing, the fluid is blocked by a cap or plug. This plug helps to create fluid pressure within the tube and jets so that while the citer circulates through the tubing and jets, fluid is also prayed out through the sprayer holes in the jets. The jet sprayer holes 142 are each directed at one of the baskets to allow the fluid exhausting the jets 114 to impinge on the baskets. The openings in the baskets allow the fluid to hydrate the planting material and the plants. The spray hydrates plants growing in up to four baskets in the periphery of the support structure.

When the valve handle is turned to the clockwise most position, the valve drain is turned on. The user can take the drain tube and position it over the side of the container and drain the fluid from the unit. The pump moves the fluid up tube 111 and into the valve, and out through the drain tube 123, thereby emptying the reservoir.

The valve 112 can be a ½ inch valve or the valve can be a ⅜ inch three-way or diverter valve. The valve can be any size that fits into the indentation for the valve in the support structure. The valve can have 180 degrees of rotation. The valve may be positioned in any position along that 180 degree arc that it can turn along. The valve may have fixed positions on it to indicate to the user when it is in each of the on, off, or drain positions.

As the plant or plants grow in the hydroponic growing unit, the roots of the plants may reach the fluid residing in the fluid reservoir. The roots may grow down to the pump. The pump housing helps to protect the pump from the roots entering the pump and interfering with its operation and ability to intake fluid. Once the roots have reached the fluid, the pump is still necessary to be powered on so that the fluid is still aerated. Without aeration, the survival time of the plants is limited. The fluid and any growing solution mixed with the fluid can be replaced every 10 to 14 days, for optimal growing conditions.

In certain exemplary embodiments, each of the components described herein are injection molded to a desired shape. In some exemplary embodiments, each component may be molded as a single, unitary molded part. In other exemplary embodiments, the component may be molded in multiple parts that are joined or attached together to form the component. The various means for designing molds, and joining various parts to form one component will be understood by one familiar with such processes and parts.

Accordingly, the various embodiments are not to be limited in scope by the specific embodiments described herein. Further, although some of the embodiments have been described herein in the context of a particular implementation in a particular environment for a particular purpose, those of ordinary skill in the art should recognize that its usefulness is not limited thereto and that the various embodiments can be beneficially implemented in any number of environments for any number of purposes. Accordingly, the claims set forth below should be construed in view of the full breadth and spirit of the embodiments as disclosed herein. While the foregoing description includes many details and specificities, it is to be understood that these have been included for purposes of explanation only, and are not to be interpreted as limitations of the various embodiments. Many modifications to the embodiments described above can be made without departing from the spirit and scope of this description.

The invention claimed is:

1. A hydroponic growing apparatus, comprising:
    a container comprising:
        a bottom surface and an open top surface; and
        an inner wall and an outer wall, with an internal volume disposed between the two walls, wherein the inner wall is circular in cross-section and extends from the bottom surface to the open top surface, wherein the outer wall extends along a height of the container, and wherein a bottom portion of the outer wall has a larger perimeter than a top portion of the outer wall;
    a fluid reservoir within the container;
    a support structure, configured to fit entirely within the container below the open top surface, comprising support beams interconnecting a plurality of openings; wherein the plurality of openings includes one centrally-located opening surrounded by peripheral openings; and
    at least one cover plate configured to fit over the support structure in the open top surface,
    wherein the container and the support structure define a plurality of apertures separated from the plurality of openings by the support beams, the at least one cover plate covering at least one of the plurality of apertures, wherein the plurality of openings are uncovered by the at least one cover plate.

2. The hydroponic growing apparatus of claim 1, further comprising:
    a pump in fluid communication with the fluid reservoir; and
    a plurality of jets in fluid communication with the pump.

3. The hydroponic growing apparatus of claim 2, further comprising:
    a plurality of tubing sections; and
    a valve connecting the pump and at least one of the plurality of tubing sections,
    wherein the plurality of tubing sections are connected to one or more of the plurality of jets such that fluid flowing through the plurality of tubing sections, from the valve, exhausts through at least one of the plurality of jets.

4. The hydroponic growing apparatus of claim 3, wherein at least two of the plurality of tubing sections are of differing lengths.

5. The hydroponic growing apparatus of claim 3, wherein the valve is a diverter valve having a first position directing fluid to the plurality of jets and a second position directing fluid to a drain tube configured to convey fluid to a location external to the container.

6. The hydroponic growing apparatus of claim 2, the support structure further comprising support for one or more of the plurality of jets.

7. The hydroponic growing apparatus of claim 2, wherein the plurality of jets are located around a periphery of the fluid reservoir near an inner surface of the container below the support structure.

8. The hydroponic growing apparatus of claim 1, wherein the fluid reservoir comprises at least a portion of a volume between the bottom surface and the open top surface.

9. The hydroponic growing apparatus of claim 1, wherein each of the at least one cover plate comprises a plurality of cut-outs corresponding to more than one of the plurality of openings of the support structure.

10. The hydroponic growing apparatus of claim 9, further comprising at least one plug configured to fit into any of the plurality of cut-outs.

11. The hydroponic growing apparatus of claim 1, further comprising a repositionable fluid level indicator tube that is positionable in the container, the repositionable fluid level indicator tube comprising a fluid level indicator.

12. The hydroponic growing apparatus of claim 1, further comprising at least one basket of a size and shape to fit into any of the plurality of openings in the support structure.

13. The hydroponic growing apparatus of claim 12, further comprising a plurality of jets in fluid communication with the fluid reservoir, wherein each of the plurality of jets is directed such that fluid exhausted from the jet impinges upon the at least one basket.

14. A hydroponic growing apparatus, comprising:
a container comprising:
an internal volume for use as a fluid reservoir;
an open top surface; and
an inner wall and an outer wall, with an internal volume disposed between the two walls, wherein the inner wall is circular in cross-section and extends from the bottom surface to the open top surface, wherein the outer wall extends along a height of the container, and wherein a bottom portion of the outer wall has a larger perimeter than a top portion of the outer wall;
a support structure comprising support beams structurally connecting five openings located entirely in the internal volume at an upper portion of the container;
a repositionable fluid level indicator tube, comprising a fluid level indicator, that is positionable in any of the five openings; and
a cover comprising one or more pieces configured to fit over the support structure in the open top surface,
wherein the container and the support structure define a plurality of apertures separated from the five openings by the support beams, the cover covering the plurality of apertures, wherein the five openings are uncovered by the cover.

15. The hydroponic growing apparatus of claim 14, further comprising at least one basket of a size and shape to fit into any of the five openings in the support structure.

16. The hydroponic growing apparatus of claim 14, wherein the cover defines five cover openings corresponding to the five openings of the support structure.

17. The hydroponic growing apparatus of claim 16, further comprising at least one plug configured to fit into any of the five openings in the cover.

18. A hydroponic growing apparatus, comprising:
means for containing a volume of fluid having a closed bottom portion and an open upper portion;
means for covering the open upper portion defining five openings including one centrally-located opening surrounded by four peripheral openings;
means for supporting a plurality of containers for hydroponic growing of plants such that the means for supporting is located entirely below the open upper portion and under the means for covering and the means for supporting lies directly under the five openings; and
means for measuring the volume of fluid that is positionable into any of the five openings.

* * * * *